April 3, 1945.   G. W. BLESSING   2,372,929
COMPOSITE STRUCTURE
Filed April 1, 1941
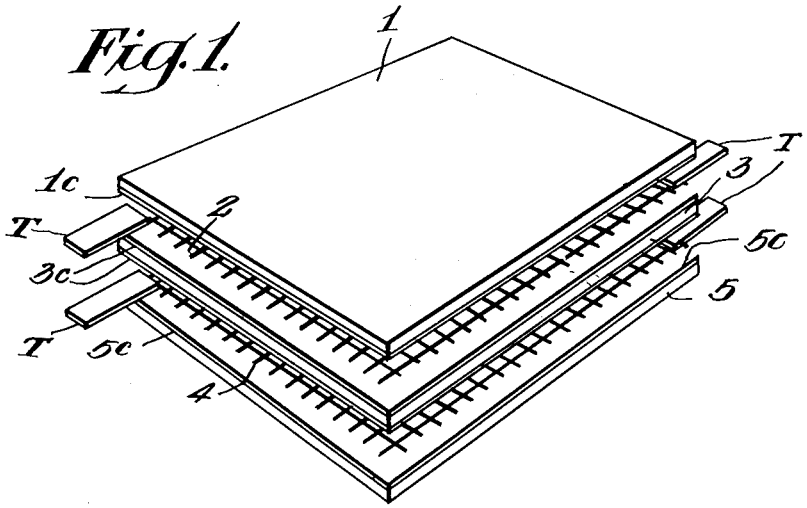
Fig.1.
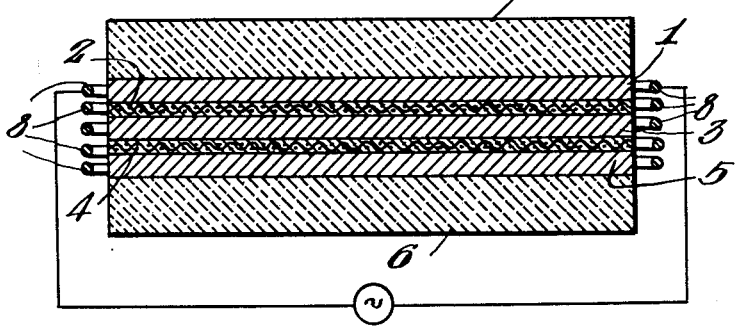
Fig.2.
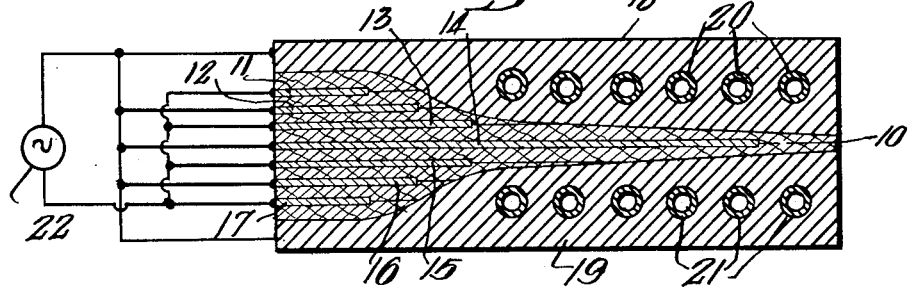
Fig.3
Inventor
Gregory W. Blessing
By
Attorney Patented Apr. 3, 1945

2,372,929

UNITED STATES PATENT OFFICE 2,372,929

COMPOSITE STRUCTURE

Gregory W. Blessing, Moorestown, N. J., assignor to Radio Corporation of America, a corporation of Delaware Application April 1, 1941, Serial No. 386,285

1 Claim. (Cl. 154—43)

This invention relates to composite structure and to methods of making the same, and has special reference to the manufacture of plywood and other insulating structures wherein the laminae or other parts are united by means of thermo-setting or thermo-plastic materials.

The principal difficulty encountered in the curing, setting, or in the polymerization of temperature responsive adhesives in laminated composite structures constituted of plywood, impregnated fabrics or fibers, pulp, leather and similar insulating materials resides in achieving a uniform distribution of heat adjacent the layer or layers of bonding material. Ordinary convection and conduction heating methods are not satisfactory in that they may result in over-curing of the outer bonds, or the marginal edges thereof, and under-curing of the inner bonds or bonding areas. In an effort to obviate this difficulty, it has heretofore been proposed to develop heat in the adhesive by pressing the parts between two metal electrodes and supplying high frequency electric current thereto. Since the usual temperature responsive adhesives are excellent insulators or, at best, very poor conductors, currents of great magnitude must ordinarily be employed to provide the requisite heating effect. The addition of certain electrolytes, or of such conducting materials as metal filings, graphite, granulated carbon. etc., to the adhesive for the purpose of inducing a heating effect with currents of low power may result in a decrease in the strength or a localization of the strength in the resulting bond.

Accordingly, the principal object of the present invention is to provide an improved method of uniting parts into a composite structure by the use of temperature responsive adhesives heated by electric currents, and one which in its practice (a) obviates the use of electrolytes or other diluents in the bonding material, (b) effects a saving in the heating current employed in the bonding operation and (c) results in a finished structure having greater strength than comparable composite structures of the prior art, and (d) is applicable to the maufacture of structures of non-uniform cross-section.

The foregoing and related objects are achieved in accordance with the invention by the use of one or more preferably light weight foraminous metal members, such for example as a wire screen, permanently interposed between the bonded surfaces. The presence of the metal insert or inserts adjacent the bonding material not only ensures a more rapid and efficient conversion of the electrical energy into heat energy at the bonding points or areas during the bonding operation, but also lends its strength, permanently, to the completed structure.

Other objects and advantages will be apparent and the invention itself will be best understood by reference to the following specification and to the accompanying drawing, wherein:

Figure 1 is an exploded view partly in perspective and partly in section showing a composite structure constructed in accordance with the principle of the present invention, Figure 2 is a partly diagrammatic sectional view of one form of apparatus including a press which may be employed in carrying the invention into effect, and Figure 3 is a partly diagrammatic sectional view of an apparatus particularly adapted to handle a composite structure of non-uniform thickness.

In carrying the invention into effect the plywood or other non-conductive parts 1, 3 and 5 which are to be united into a composite structure are first provided each on the side to be joined with a coating 1c, 3c, 5c, respectively, which may be constituted of unpolymerized urea or phenol-formaldehyde resin, or other thermo-setting resinous material, or of a thermoplastic bonding material such, for example, as hydrolized polyvinyl acetate or a combination of polyvinyl acetate and an alkyd resin. The coatings c in any event are preferably in a dry state and free from bubble-forming solvents prior to being stacked or assembled with the interposed foraminous metal inserts 2 and 4 on the bed of a press. The metal inserts 2 and 4 preferably comprise woven wire screens but may comprise punched metal foil or punched thin metal plates and may be provided with tabs T which extend beyond an outer edge or edges of the parts 1, 3 and 5 in the event that either the direct or alternating electric current employed in the bonding operation is to be applied directly thereto.

Referring particularly to Fig. 2: The pressure necessarily employed in the bonding operation may be supplied by a press having a bed 6 and a head 7 which are constituted, in this case, of a non-conductive material and are of a contour and size adapted to accept the particular stack or assembly to be processed. In the instant case, the metal inserts 2 and 4 are heated inductively as by means of a primary coil 8 surrounding the stack or which may be in the form of helices embedded, respectively, in the insulating bed and head of the press. In either event, the metal inserts 2 and 4 being excellent conductors are readily heated (thereby effecting a saving in power) and quickly bring the bonding material to the desired bonding temperature. The pressure applied as the head 7 of the press is brought down on the stack or assembly causes the now softened bonding material to enter and fill the interstices in the screens 2 and 4 and to fill all margins or voids in the assembly. The stack is then cooled under pressure without removing the metal inserts 2 and 4 which thus lend their strength permanently to the completed structure.

In some cases, depending upon the size and shape of the stack, it may be advisable to employ a combination of conducted or convected heat and electrically induced heat to obtain a desired heat pattern with precision control of said heat pattern.

By way of example, in the manufacture of wooden propellers for aircraft by conventional bonding methods, the blade and tip portions may frequently be overcured (and hence brittle) and the hub and blade portions undercured (as is manifest by a lack of strength) due to difficulties in controlling the heat pattern during the bonding operation. This difficulty is obviated in accordance with the present invention by a proper distribution of the interposed metallic layers in the hub and blade portions and by the use of a combination of different kinds or sources of heat. Thus, referring to Figure 3, there is shown a wooden propeller blank 10 having a central metallic insert 14 which extends from the hub outwardly through the blade portion to a point adjacent the tip, and a number of other metal inserts 11, 12, 13 and 15, 16 and 17 grouped on opposite sides of the insert 14 which are confined more or less to the hub and hub-end of the blade portion of the propeller blank or assembly. The press here employed in the bonding operation comprises a metal head 18 and metal base 19 which are provided in their interiors with conduits 20, 21, respectively, through which steam or other heating fluid may be circulated. These heating conduits or coils 20, 21 are preferably but not necessarily confined to the blade and tip portions of the propeller structure. A high frequency current from a suitable source 22 is applied between the separate plates 18—19 of the press and/or between the several foraminous metal inserts 11 to 17 preferably by connecting the said press plates and the tabs with which the inserts are provided, alternately, to the opposite poles of the generator. The press plates 18 and 19 and the metal inserts 11—17 thus comprise the armature plates of a capacitor whose intervening dielectric medium comprises the insulating structural and bonding materials and the dielectric losses in the "stack" convert the electrical energy into heat. The dielectric losses will be greater adjacent the hub (because of the greater quantity of dielectric material adjacent the hub) than adjacent the blade and tip portions. The proper distribution of the heat resulting from the dissipation of the electrical energy in dielectric losses is ensured by properly spacing the metal inserts. Thus, if a higher bonding temperature is desired along the axis of the propeller, the metal inserts adjacent the axis may be more closely spaced than they are adjacent the surface of the propeller. Ordinarily, what may be called "undercuring" is desirable adjacent the outer blade portion and tip of a plywood propeller, since such undercuring results in some flexibility. The proper control of the heat pattern adjacent the outer end of the propeller is in any event more accurately ensured by the selective or dual use of a steam-heated press and the proper dissipation, in the form of heat, of the electrical energy supplied to the metal inserts.

Other modifications of the invention will suggest themselves to those skilled in the art. It is to be understood therefore that the foregoing is to be interpreted as illustrative and not in a limiting sense except as required by the prior art and by the spirit of the appended claim.

What is claimed is:

A composite structure of non-uniform thickness comprising at least three structural elements constituted of nonconductive material, a plurality of electrically conductive structural elements arranged in capacitive relation on opposite sides of the inner of said nonconductive elements and each adapted to be maintained at substantially the same potential over its area, the area of the conductive capacitive elements adjacent the area of greater thickness of said structure being greater than adjacent the areas of lesser thickness, and a thermo-setting adhesive responsive to capacitive heating interposed in bonding relation between said conductive and said inner nonconductive structural elements, said adhesive being set by capacitive heating therein provided by a high frequency electric field established between said capacitive elements.

GREGORY W. BLESSING.